US012481057B2

(12) United States Patent
Sishtla et al.

(10) Patent No.: US 12,481,057 B2
(45) Date of Patent: Nov. 25, 2025

(54) ICE CRYSTAL DETECTION AND QUALIFICATION USING VERTICAL WEATHER CELL STRUCTURE

(71) Applicant: Rockwell Collins, Inc., Cedar Rapids, IA (US)

(72) Inventors: Venkata A. Sishtla, Cedar Rapids, IA (US); Xingming Wang, Marion, IA (US); Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 395 days.

(21) Appl. No.: 17/854,363

(22) Filed: Jun. 30, 2022

(65) Prior Publication Data
US 2023/0003879 A1    Jan. 5, 2023

Related U.S. Application Data

(60) Provisional application No. 63/217,673, filed on Jul. 1, 2021.

(51) Int. Cl.
*G01S 13/95*    (2006.01)
*G01S 7/04*    (2006.01)

(52) U.S. Cl.
CPC ........... *G01S 13/953* (2013.01); *G01S 7/04* (2013.01)

(58) Field of Classification Search
CPC . G01S 13/953; G01S 7/04; G01S 7/10; G01S 13/10; G01S 7/41; G01S 2013/0254; Y02A 90/10
See application file for complete search history.

(56) References Cited

U.S. PATENT DOCUMENTS

| | | | |
|---|---|---|---|
| 5,028,929 A | * | 7/1991 | Sand ............... G01S 13/953 342/26 B |
| 6,377,202 B1 | | 4/2002 | Kropfli et al. |
| 7,541,971 B1 | | 6/2009 | Woodell et al. |
| 7,714,767 B1 | | 5/2010 | Kronfeld et al. |
| 7,817,078 B2 | | 10/2010 | Bunch |
| | | (Continued) | |

FOREIGN PATENT DOCUMENTS

CN    112068104 A    12/2020

OTHER PUBLICATIONS

Bravin-ICI_FSF_Bravin_20181023.pdf from https://flightsafety.org/wp-content/uploads/2018/11/Bravin-ICI_FSF_Bravin_20181023.pdf (Year: 2018).*

(Continued)

*Primary Examiner* — Vladimir Magloire
*Assistant Examiner* — Yonghong Li
(74) *Attorney, Agent, or Firm* — Suiter Swantz IP

(57) ABSTRACT

A system and method for ice crystal detection and qualification are disclosed. The system for ice crystal detection may include an aircraft weather radar and processing circuitry. The aircraft weather radar may perform scans at one or more elevations at successive times. The processing circuitry may calculate power and reflectivity values based on the scans. The processing circuitry may further compare the power and reflectivity values to threshold values to determine the presence of ice water content. The processing circuitry may display different colors on a display for areas in which the power and reflectivity values are lower than the threshold values.

16 Claims, 4 Drawing Sheets

(56) References Cited

U.S. PATENT DOCUMENTS

| | | | |
|---|---|---|---|
| 9,244,167 B1 | 1/2016 | Oransky et al. | |
| 9,720,082 B1 | 8/2017 | Dana et al. | |
| 9,864,055 B1 | 1/2018 | Sishtla et al. | |
| 10,605,912 B1 * | 3/2020 | Godfrey | G01S 13/953 |
| 10,725,173 B2 | 7/2020 | Ray et al. | |
| 10,782,406 B2 | 9/2020 | Essawy et al. | |
| 10,816,661 B2 | 10/2020 | Ray et al. | |
| 10,877,150 B2 * | 12/2020 | Badin | G01S 13/953 |
| 10,908,278 B2 | 2/2021 | Bunch et al. | |
| 10,935,693 B2 | 3/2021 | Lukas et al. | |
| 2008/0001808 A1 * | 1/2008 | Passarelli | G01S 13/5244 342/26 R |
| 2011/0288776 A1 | 11/2011 | Lilie et al. | |
| 2014/0331161 A1 | 11/2014 | Venkataswamy et al. | |
| 2016/0274271 A1 * | 9/2016 | Lukas | G01W 1/02 |
| 2019/0113618 A1 | 4/2019 | Lukas et al. | |
| 2019/0277964 A1 | 9/2019 | Badin et al. | |
| 2021/0132220 A1 | 5/2021 | Badin et al. | |
| 2023/0133643 A1 | 5/2023 | Finley et al. | |
| 2023/0134507 A1 | 5/2023 | Finley et al. | |

OTHER PUBLICATIONS

Extended European Search Report in European Application No. 22182680.3 dated Nov. 23, 2022, 8 pages.

* cited by examiner

ICE CRYSTAL DETECTION AND QUALIFICATION USING VERTICAL WEATHER CELL STRUCTURE

CROSS-REFERENCE TO RELATED APPLICATIONS

The present application is related to and claims the benefit under 35 U.S.C § 119(e) of U.S. Provisional Application Ser. No. 63/217,673 filed Jul. 7, 2021, entitled ICE CRYSTAL DETECTION AND QUALIFICATION USING VERTICAL WEATHER CELL STRUCTURE, naming Venkata Sishtla, Xingming Wang, and Jeffery Finley as inventors. Further, the present application is related to co-pending U.S. application Ser. No. 17/516,980, filed Nov. 2, 2021, entitled HYBRID ICE DETECTION USING AIRBORNE WEATHER RADAR, naming Jeffery Finley and Venkata Sishtla as inventors, and co-pending U.S. application Ser. No. 17/517,001, filed Nov. 2, 2021, entitled RADAR ICE CRYSTAL DETECTION THROUGH SINGLE BEAM INTEGRATION, naming Jeffery Finley and Venkata Sishtla as inventors. All of these applications are incorporated by reference herein in their entireties.

BACKGROUND

The present invention is concerned with atmospheric ice crystals in and around clouds. Ice crystals are known to form in high altitude cloud structures as well as in and around developing and active convective activity. Areas with higher concentrations of atmospheric ice crystals pose significant risks to aircraft. Rather than accruing on aircraft surfaces, atmospheric ice crystals abrade and damage critical aircraft elements, such as engine components and pilot systems. This damage can be difficult to detect and can lead to costly repairs.

While pilots generally avoid convective activity, they do operate in high altitude cloud structures, as well as above, around, and below the strongest areas of convective activity. Currently, these convective areas can be detected by in-flight weather radar and lightning detection equipment on board the aircraft, and by dual polarimetric methods on the ground. Research and flight test data indicates that the radar measured echo strength for areas with higher Ice Water Content (IWC) tend to decrease at a slower rate with altitude/temperature than for areas that do not have higher probability IWC. However, there is currently no instruments capable of detecting ice crystals at longer ranges. Additionally, although current in-flight weather radar can infer the presence of ice crystals, they are prone to nuisance alerts and hence need to be qualified.

SUMMARY

A system and method for ice crystal detection and qualification are disclosed. In one embodiment, echo power may be determined using a mechanically steered radar performing continuous or successive scans at different elevations with each scan spaced in time. In other embodiments an electronically steered antenna (ESA) may be utilized to perform two elevations scans that are not spaced in time. The echo power may be analyzed to detect and then qualify the presence and location of IWC in one of two ways: (1) Detection 100 and (2) Qualification 200. Through detection 100, the radar signal processor (RSP) may directly use a vertical storm characteristic model to determine and annunciate the presence of ice crystals. Through qualification 200, in order to reduce nuisance alerts, the RSP may use other algorithms such as functions relating single pulse reflectivity (Z) and IWC to determine the probability of icing and use the vertical storm characteristics to qualify detection.

In other embodiments, the airborne radar may also consider vertical storm structure to infer the presence of ice crystals. For areas with high probability of ice crystals, the reflected power changes with altitude/temperature at a rate slower than the rate of areas with a lower probability of ice crystals. The radar may compute a power residual based on scans at different elevations and compare each scan, pair of scans, scans of the same elevation, against a threshold. Icing is confirmed if the power residual is less than the threshold. This method may also be used to qualify ice crystals and hence reduce the probability of nuisance alerts.

In preferred embodiments of the present invention, first in-flight radar echo power is computed from at least two antenna elevations. Next, the logarithm of the powers is computed for the at least two elevations using an area parameter to reduce signal noise. A power residual which could be computed as the ratio of the logarithm of the power is then computed and compared to a threshold. Aircraft crew may then be informed aurally or visually of water ice crystal presence when the determined ratio is lower than the selected or determined ratio.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
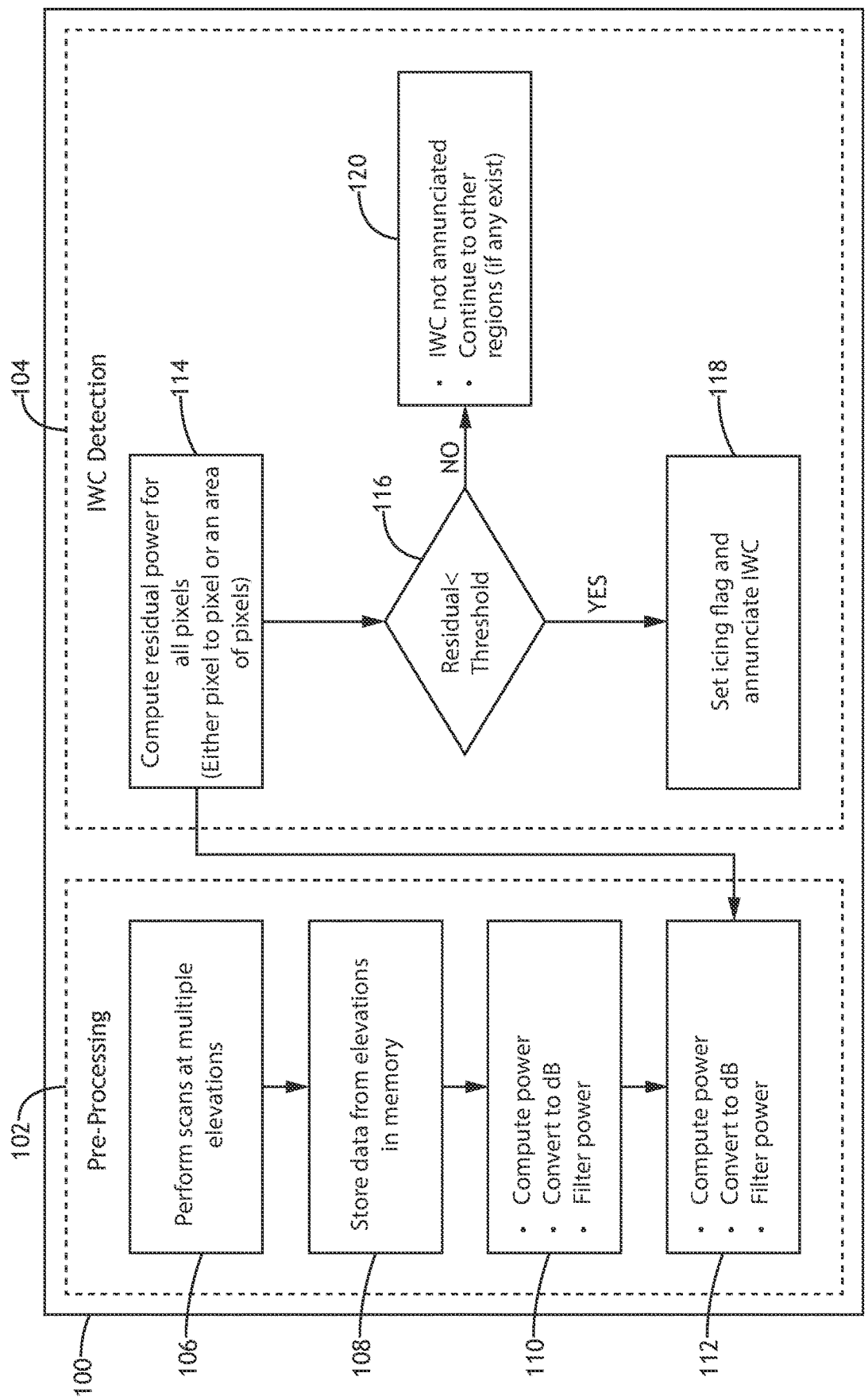
FIG. 1 is a flow diagram illustrating an embodiment of an IWC detection system of the present invention.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

A system and method for ice crystal detection and qualification are disclosed.

Applicant's research and flight test data indicates that the radar measured echo strength for areas with higher IWC tend to decrease at a slower rate with altitude/temperature than for areas that do not have higher probability of IWC. Echo power may be determined using a mechanically steered radar performing continuous or successive scans at different elevations with each scan spaced in time. In other embodiments an Electronically Steered Antenna (ESA) may be utilized to perform two elevations scans that are not spaced in time. The echo power may be analyzed to detect and then qualify the presence and location of water ice crystals in one of two ways: (1) Detection 100 (FIG. 1): The Radar Signal Processor (RSP) may directly use a vertical storm characteristic model to determine and annunciate the presence of ice crystals; and (2) Qualification 200 (FIG. 2): In order to reduce nuisance alerts, the RSP may use other algorithms such as functions relating single pulse reflectivity (Z) and IWC to determine the probability of icing and use the vertical storm characteristics to qualify detection.

Referring to FIG. 1, the system performs a pre-processing phase 102 followed by an IWC detection phase 104. During the pre-processing phase 102, the RSP commands the antenna to perform at least two scans 106 in at least two elevations. The elevation angles of the at least two scans 106 may depend, for example, on the aircraft altitude, static air temperature measured by the aircraft, total temperature, pressure, lapse rate, terrain, echo strength gradient, reflectivity gradient, and the like, as these variables may affect air density, light scattering, and radar functions. The echoes received from each elevation are sampled and stored in memory 108. During these scans 106, the radar can transmit a single pulse or a series of pulses. The pulse rate may be set at a rate that will not interfere with the transmission or receipt of sequential pulses. These pulses can be unmodulated pulses or can have some form of amplitude, frequency or phase modulation. For each pixel sampled for the at least two scans, the RSP computes the raw power, performs a log operation on the power to convert it into dB 110, and filters this power in dB to reduce noise and other unwanted echoes 112. For example, according to:

$$Power(\text{dB}) = 10 * log_{10}(raw\ power)$$

Power is the radar echo strength for each range bin/pixel in front of the aircraft. It is a function of several radar parameters, such as transmitter power, antenna gain, frequency, and the like, as well as several environmental factors, such as the amount of rain, the ground, and the like. Power is calculated as $I^2 + Q^2$, where I and Q are analog to digital voltage values.

Using the log power from the different elevations, the processing circuitry computes a power residual for all pixels 114. For a two-elevation scheme 300 with a first elevation with a certain power 302 and a second elevation with another power 304, the power residual 402 may be calculated as follows:

$$Power\ Residual = (Power\ (\text{dB})\ at\ elevation_1) - (Power\ (\text{dB})\ at\ elevation_2)$$

In another embodiment, the power residual can be computed as follows in equation 3:

$$Power\ Residual = 10 * log_{10}\left(\frac{Power\ (\text{dB})\ at\ elevation_1}{Power\ (\text{dB})\ at\ elevation_2}\right)$$

This power residual is then compared with a threshold value 116. This exact threshold value is obtained based on data analyses and may vary for different IWC intensities (e.g., moderate vs high). An icing flag is set and IWC is annunciated if the power residual is less than the threshold 118. The logic for this comparison may be determined from:

IF (power residual for a pixel or an area of pixels<threshold)
THEN IWC for the pixel or area of pixels=TRUE
ELSE IWC for the pixels or area of pixels=FALSE In a power residual and IWC analysis 400, the RSP may assign a predetermined symbol (for example, yellow or red speckles) for each pixel or area of pixels where the IWC flag is TRUE and then send this information to be displayed 404.

In the case that the power residual is higher than the threshold, IWC is not annunciated and the system continues to other regions, if any exist 120.

Figure 2:
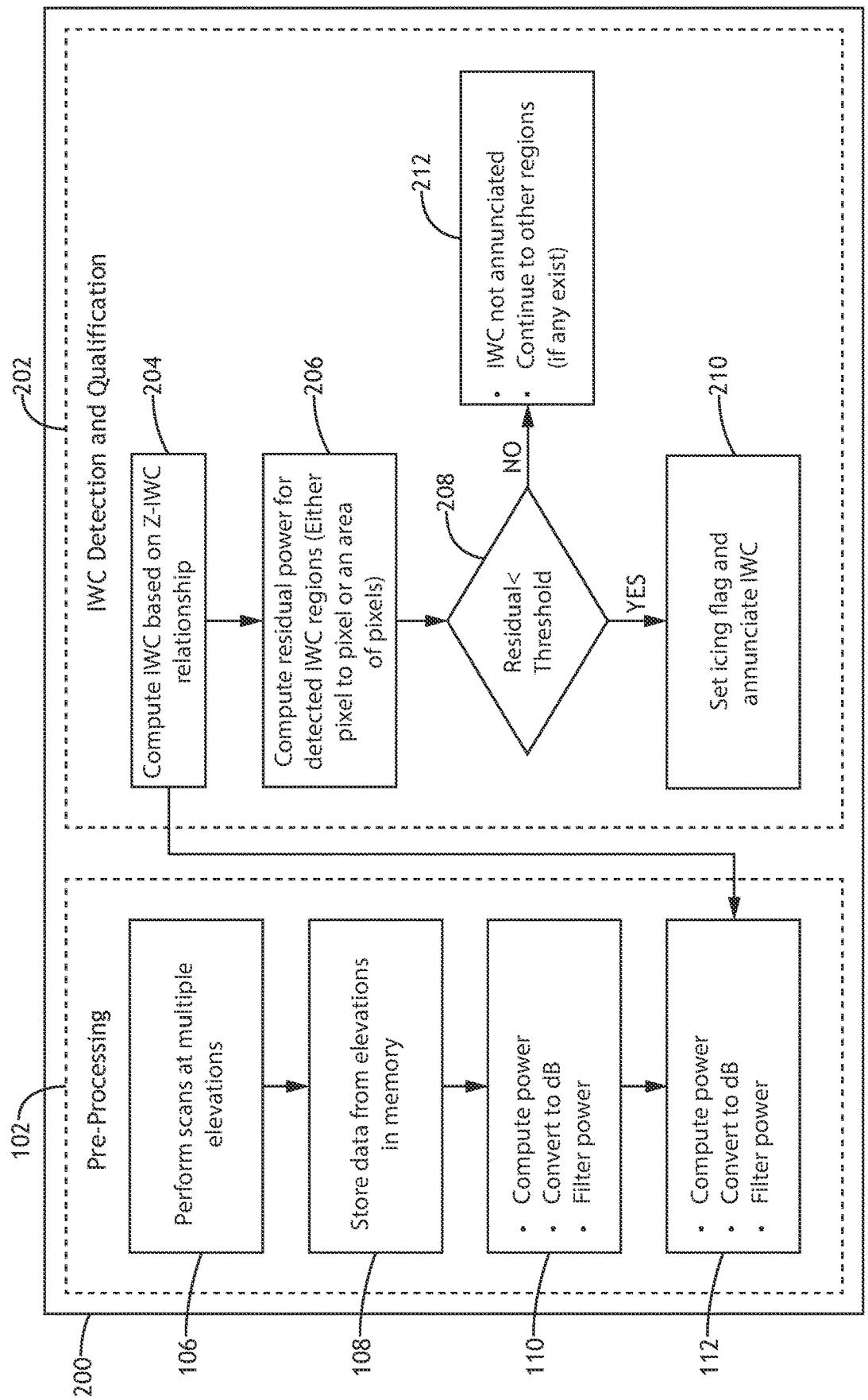
FIG. 2 is a flow diagram depicting an embodiment of the IWC detection and qualification system of the present invention.
Figure 3:
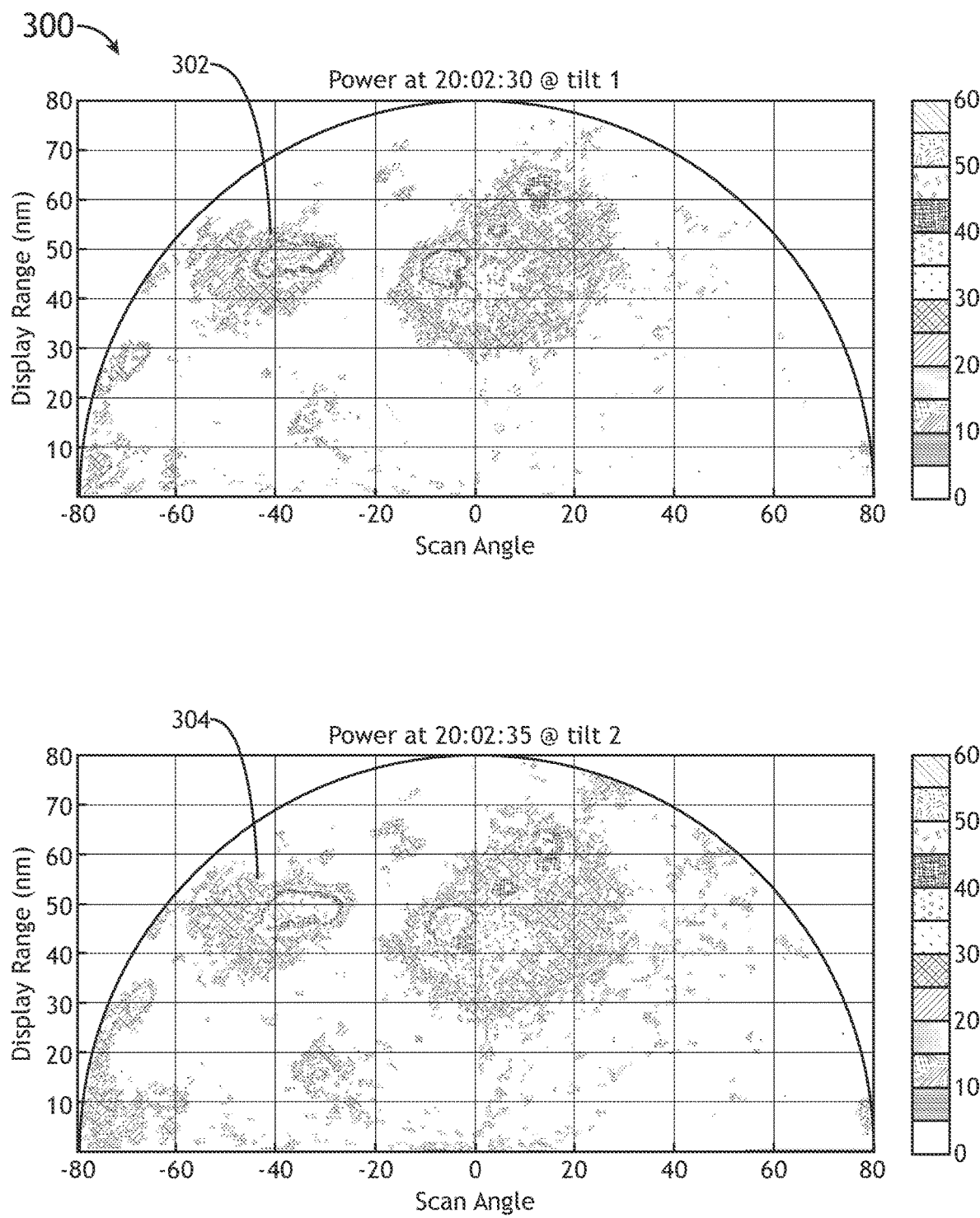
FIG. 3 is an illustration of a first example of the power (dB) returns of first and second radar scans at a first and second elevation.
Figure 4:
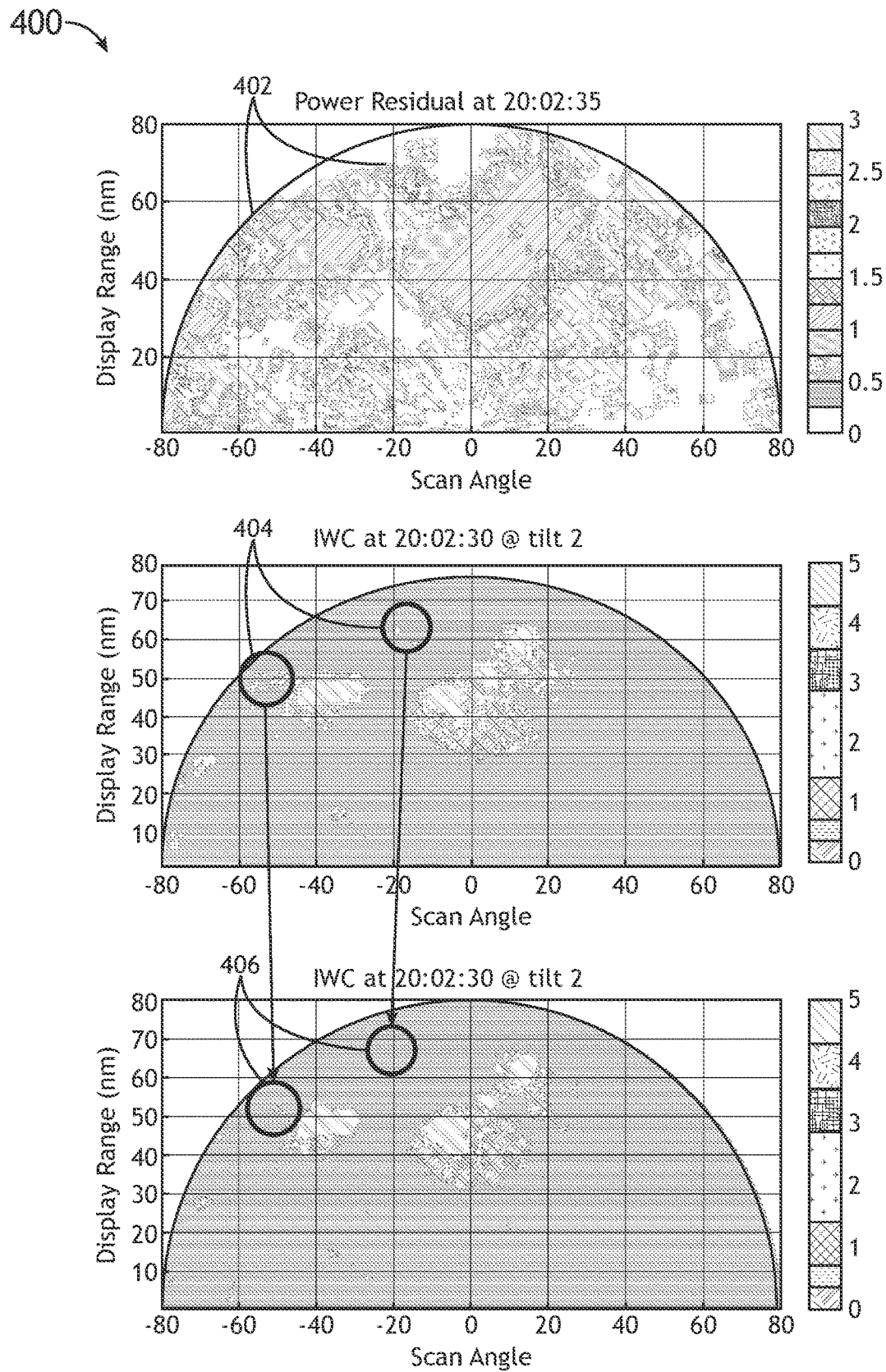
FIG. 4 is an illustration of a first example of a power residual and an estimate of the location of IWC in accordance with an embodiment of the present invention.

Referring to FIG. 2, in this embodiment, the vertical storm structure is used for qualification 202 of detected IWC 200. For each pixel sampled, the RSP computes a reflectivity based on the measured power. Reflectivity (Z) is the sum of the diameter of each hydrometeor raised to the sixth power per cubic meter. It is a function of particle diameter and particle density, as well as a function of range. In relation to range, reflectivity decreases as a second power or fourth power. Reflectivity cannot be directly measured by a radar, but instead must be estimated based on radar parameters. The relationship between received power and reflectivity is calculated according to methods used by those skilled in the art. The industry standard term for this reflectivity is 'Z'. A log operation is performed on this Z which results in a parameter with units of dBZ.

$$Z = f(Power)$$

$$dBz = 10 * log_{10}(Z)$$

The RSP then computes an estimate to IWC based on the relationship between Z and IWC 204. One example of dBz-IWC relationship is given as:

$$IWC = A^{B * dBz^C + D}$$

Where the IWC is grams per cubic meter. The values of A, B, C and D will depend on several factors including altitude, static air temperature, total temperature, pressure, lapse rate, terrain, echo strength gradient, reflectivity gradient, and the like.

Preferably, the calculated IWC is then qualified to confirm real events and eliminate false or nuisance detection. In a preferred embodiment the qualification logic resembles the previously described detection logic. For the pixels having a valid IWC detection (for example, IWC>0.8 grams per cubic meter), the power residual in that pixel or an area of pixels is compared to a threshold 208. The IWC in a pixel or an area of pixels is qualified and an icing flag is set to TRUE if the power residual is less than a predetermined threshold 210. All other IWC values are disqualified and a corresponding IWC flag for that pixel is set to false 212. The RSP can then assign a predetermined symbol (for example, yellow or red speckles) for each pixel or area of pixels whose IWC flag is TRUE and send this information to be displayed 210.

In other embodiments of the present invention the ice water crystal detection and qualification system of the present invention may also utilize successive echo power versus reflectivity in determining the location and presence of ice water crystals in the flight path of an aircraft. For example, the present invention, in at least one embodiment, may calculate the presence and location (altitude and coordinates) via successive comparisons of a first comparison of the echo power of a pair of successive beams at different elevations against a second comparison of the reflectivity of a pair of successive beams at different elevations. Power and reflectivity below a set threshold calculated according to atmospheric characteristics (e.g., static temperature, total temperature, pressure, lapse rate, terrain, echo strength gradient, reflectivity gradient, and the like) can be used to detect the presence and locations of ice crystals.

It is to be understood that embodiments of the methods disclosed herein may include one or more of the steps described herein. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An ice water content detection system comprising:
   a weather radar device configured to:
   transmit a first beam comprising radar signals at a first elevation, wherein the first elevation corresponds to a first tilt;
   receive a reflection of the first beam at a first time,
   transmit a second beam comprising radar signals at a second elevation after transmitting said first beam, wherein the second elevation corresponds to a second tilt; and
   receive a reflection of the second beam at a second time, wherein the first beam and the second beam form a pair of successive beams at different elevations, wherein the weather radar device is further configured to generate at least a first pair of successive beams and a second pair of successive beams at different elevations; and
   detect the presence of ice crystals by measuring a vertical gradient of return power of the radar signals reflected from weather targets;
   processing circuitry configured to:
   determine a logarithm of the echo power based on the reflection of the first beam;
   determine a logarithm of the echo power based on the reflection of the second beam;
   determine a first ratio of the logarithms of the echo power of said first and second beams for the first pair of successive beams;
   determine a second ratio of the logarithms of the echo power of said first and second beams for the second pair of successive beams;
   compare the first ratio and the second ratio to a threshold at least partially derived by air temperature;
   compare the first ratio and the second ratio;
   determine a probability of icing, based at least on the comparison of the first ratio and the second ratio;
   qualify the ice crystals according to the vertical gradient of return power from the weather targets; and
   announce the presence of the ice crystals if said ratio is lower than said threshold; and
   a display system configured to:
   display different colors corresponding to different calculated ratios of logarithms of echo powers to the threshold.

2. The ice water content detection system of claim 1 wherein the first elevation and the second elevation may depend at least partially on aircraft altitude, static air temperature, total air temperature, pressure, lapse rate, terrain, echo strength gradient, and reflectivity.

3. The ice water content detection system of claim 1 wherein the first and second beams can be a single pulse or a series of pulses.

4. The ice water content detection of claim 3 wherein the single pulse or the series of pulses can be modulated or unmodulated.

5. The ice water content detection system of claim 3 wherein the first elevation and the second elevation depend at least partially on aircraft altitude and static air temperature.

6. The ice water content detection system of claim 3 wherein the echo power of the first and second beams is translated from a raw value into a decibel value via a log operation.

7. The ice water content detection system of claim 6 wherein the single pulse or the series of pulses can be modulated or unmodulated.

8. The ice water content detection system of claim 6 where the decibel value is further filtered to reduce noise and other unwanted echoes.

9. The ice water content detection system of claim 3 wherein the processing circuitry is further configured to cause the display system to display an output displaying the presence of the ice crystals in response to determining the presence of the ice crystals relative to the position of an aircraft.

10. The ice water content detection system of claim 1 wherein the echo power of the first and second beams is translated from a raw value into a decibel value via a log operation.

11. The ice water content detection system of claim 10 where the decibel value is further filtered to reduce noise and other unwanted echoes.

12. The ice water content detection system of claim 1 wherein the processing circuitry is further configured to generate an output causing the display system to display the presence of the ice crystals in response to determining the presence of the ice crystals relative to the position of an aircraft.

13. The ice water content detection system of claim 1 wherein the processing circuitry is further configured to determine and cause the display system to display a location of a storm cell based on the echo power of the first and second beams in a volume of space downwind from said storm cell.

14. The ice water content detection system of claim 1 wherein the processing circuitry is further configured to cause the display system to:
classify and display a first portion of said volume of space as the ice crystals by displaying a first color;
classify and display a second portion of said volume of space as rain by displaying a second color;
classify and display a third portion of said volume of space by displaying a third color; and
classify and display a fourth volume of said space as mixed phase by displaying a fourth color.

15. The ice water content detection system of claim 1 wherein the processing circuitry is further configured to:
compare echo power values for the first beam and the second beam;
compare reflectivity values for the first beam and the second beam; and
calculate the presence and location of the ice crystals via a comparison of the comparison of the echo power values and the reflectivity values for the first and second beams.

16. A method for detecting ice water content comprising:
transmitting a first beam comprising radar signals at a first elevation, wherein the first elevation corresponds to a first tilt;
receiving a reflection of the first beam;
transmitting a second beam comprising radar signals at a second elevation, wherein the second elevation corresponds to a second tilt; and
receiving a reflection of the second beam at a second time, wherein the first beam and the second beam form a pair of successive beams at different elevations, wherein the weather radar device is further configured to generate at least a first pair of successive beams and a second pair of successive beams at different elevations; and
determining the logarithm of the echo power based on the reflection of the first beam;
determining the logarithm of the echo power based on the reflection of the second beam;
determining a first ratio of the logarithms of the echo power of said first and second beams for the first pair of successive beams;
determining a second ratio of the logarithms of the echo power of said first and second beams for the second pair of successive beams;
comparing the first ratio and the second ratio to a threshold at least partially derived by air temperature;
comparing the first ratio and the second ratio;
determining a probability of icing, based at least on the comparison of the first ratio and the second ratio; and
announcing the presence of the ice crystals if said ratio is lower than said threshold.

* * * * *